Patented Jan. 15, 1952

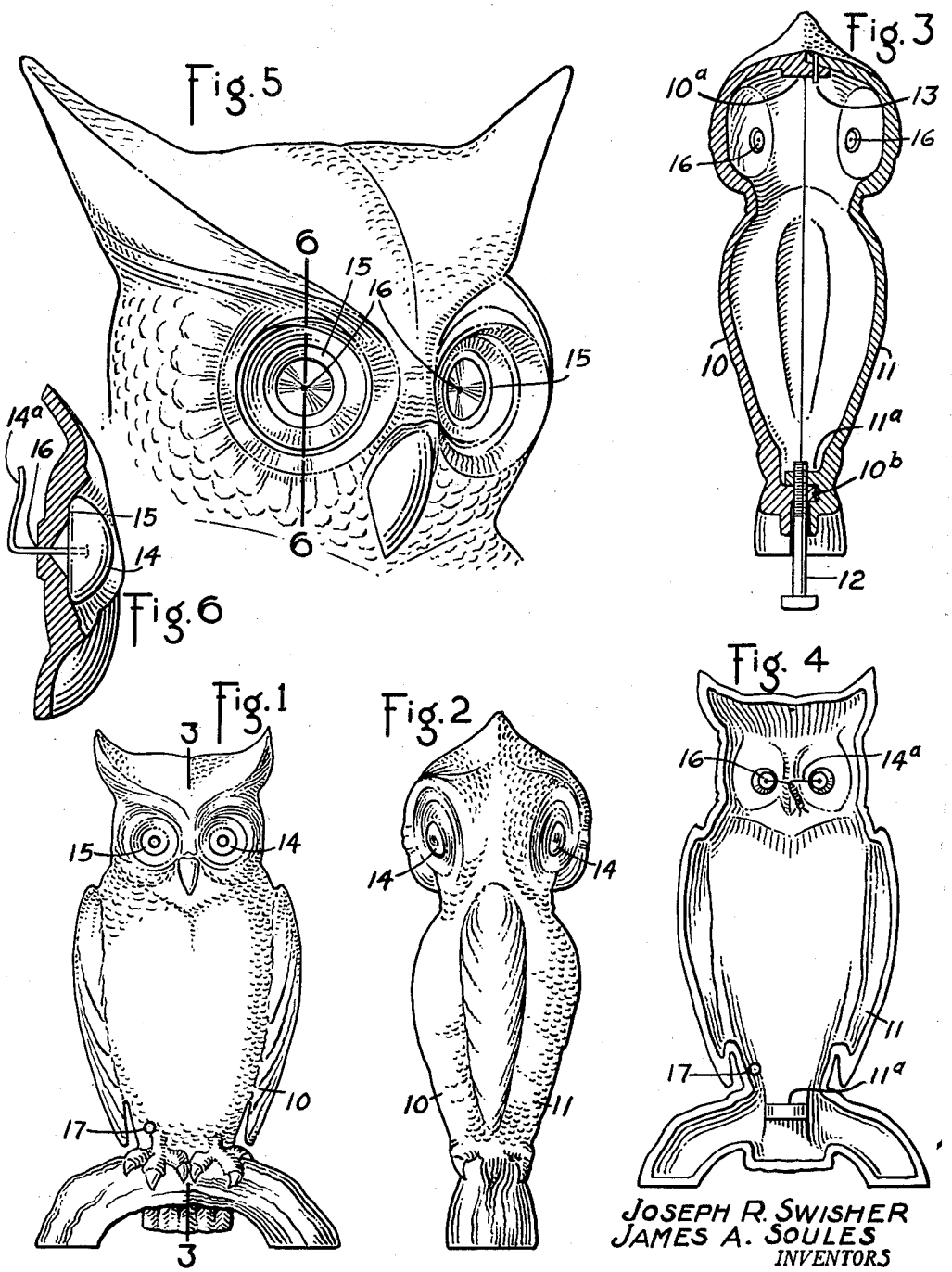

2,582,514

UNITED STATES PATENT OFFICE 2,582,514

DOUBLE-FACED SCARE-BIRD OWL

Joseph R. Swisher and James A. Soules,
Decatur, Ill.

Application September 12, 1947, Serial No. 773,558

1 Claim. (Cl. 46—115)

This invention relates to devices for the purpose of scaring away starlings, blackbirds and other birds commonly known as nuisances and pests, and it has more particularly to do with the elimination of starlings and the like from trees in public parks and residential districts, from farm crops and buildings, and from public buildings such as office buildings, hotel buildings and the like, where such birds congregate in great numbers.

In the heretofore usual means for pest control, such as shooting, asphyxiation, poison grain and various other means, the important factor of the health and safety of the public as well as that of domestic fowls and small animals, which, together with the damage to buildings and property—resulting from shooting—have proved such means inadvisable, while the excessive cost of the installation and maintenance of equipment for the electrocution of birds of the aforesaid type, has rendered such control means prohibitive.

It is well known that starlings and certain other birds fear owls as their natural enemies, and in actual use my invention has, in a single day, rid entire office buildings, hotels, and other large areas of all starlings and other objectionable birds, thereby eliminating the nuisance of noise and unsightly droppings on building faces, sidewalks, awnings et cetera, as well as the loss of substantial quantities of crops on farms and rural districts due to the consumption of field grain, vegetables and fruit, by thousands of birds in assemblies.

A broad object, then, of the present invention is to quickly, noiselessly, safely and completely eliminate birds of the class hereinbefore mentioned, and particularly starlings, from any gathering place, whether it be a residence, public park, public building, crop storage building, an open field, or a field of standing crops, by the simple, though effective means of exposing to the view of such birds a natural appearing figure of an owl, which may be readily secured and safely mounted at any suitable and visible point in the desired location.

More specifically, an object of the invention is to produce a novel type of scare-bird device approaching nearly the natural appearance of an actual owl, but having twin, oppositely facing front portions, the complete assembly being formed in two identical, hollow, fittedly matched and connected half portions which produce the appearance of a dual faced owl.

Another object is to provide a pair of half portions in an owl of this type, preferably metal, formed hollow, and carrying in each half integral lugs adapted for matched and associated relation in the assembly of the two half portions into a unit for the purpose herein set forth.

A further object is to provide a characteristic scare-bird device having suitable eye sockets in which glass eyes may be mounted for the purpose of giving naturalness to the appearance of the invention; and a still further object for this purpose is to provide an applied coating of felt flocks exteriorly to the invention, thus to simulate the appearance and color of the feathers and down of an actual owl.

An object, too, is to provide such assembly means as will serve as well to mount the invention fixedly on a tree limb or any other suitable object or base.

Other objects and advantages to be attained will hereinafter more fully appear in the following description.

It is here noted that for the purpose of the present invention, the size and color of the scare-bird owl may be varied at will, as desired, to meet varying conditions and locations in use, and that in view of the foregoing description, the present invention is distinguished from the known and simply ornamental single faced owls having merely painted coating often unnatural in appearance and made of paper by-products and similar material which is not resistant to exposure to the elements. It is also here noted that in the practical use of the present invention it has been found that the use of metal as the body material, with glass for the eyes, and a coating of felt flocks applied to the exterior of the assembled unit, has proved the more practical and satisfactory all around.

Without limitation, therefore, such adaptation is set forth as the preferred embodiment of the invention.

In actual practice this particular form of scare-bird owl produces the desired result, in that the birds flying about it cannot actually fly behind it or alight behind it because there is no back to it, and because at least one of its twin faces and pairs of eyes are visible from almost any angle, and hold forth a constant threat to the bird nuisances, causing them to avoid and remain away from any location where this invention is placed.

In the accompanying drawings:

Fig. 1 is an elevational view of one face of the complete scare-bird owl;

Fig. 2 is a side elevational view;

Fig. 3 is a sectional view taken on the line

3—3 of Fig. 1, but the wire connecting the two glass eyes omitted;

Fig. 4 is an elevational view showing the inside of one of the half portions, and showing the two wires from the two eyes brought together and twisted inside said half portion for the purpose of mounting said eyes;

Fig. 5 is an enlarged perspective view of the head portion only, of one of the half portions and, Fig. 6 is a fragmentary section taken on the line 6—6 of Fig. 5.

Referring now to the drawings in detail, the numeral 10 designates one of the half portions having adjacent and projecting from its inner edge at its top the lug 10$^a$, while the lug 10$^b$ projects inwardly adjacent its bottom. The numeral 11 designates the other half portion from which projects inwardly the lug 11$^a$ which is positioned to co-operate with said lug 10$^b$ in said half portion 10 to threadably engage—by means of threaded, alined, holes in said lugs 10$^b$ and 11$^a$—the threaded bolt 12 for the dual purpose of assembling and of mounting the invention on a tree limb or other suitable vantage place. A pin 13 engages alined holes in the top of the half portion 11 and the lug 10$^a$ of the half portion 10 for the purpose of securely holding together the top of said half portions 10 and 11.

The glass eyes 14 having integrally mounted therein the wire member 14$^a$, (see Fig. 6), are adapted to set into the sockets 15, (see Fig. 5, in which said eyes are not shown), said wire member protruding through a hole 16 in the center of each of said sockets 15, and the wire members 14$^a$ of each pair of eyes 14 in each of the half portions 10 and 11 are brought together and twisted on each other to securely hold said eyes in position as shown in Fig. 4.

A hole 17 through from face to face near the base of the invention is provided for the attachment thereto of a chain or other suitable locking means to insure against theft or accidental fall.

When this double faced owl is completely assembled as herein described, the feet and the portion immediately surrounding the eye sockets are painted, usually black, and allowed to dry, and the balance of the object is then coated with varnish which is allowed to become tacky, at which time the then varnished portions are sprayed with a coating of felt flocks of a desired color. The felt flocks adhere to the tacky varnish surface and impart a life-like appearance to the whole. It has been found that this type of coating for the invention is not harmed by rain or sun, or temperature changes, and provides an effective weather-proof and natural appearing coating.

It is further noted that while the illustrated structure is a practical exemplification of the invention, material alterations and modifications are contemplated within the scope and spirit of the appended claim. The invention, therefore, is not limited to the specific construction and arrangement shown.

What is claimed is:

In a device for scaring away starlings, blackbirds and other bird nuisances, the figure of a predatory bird having two identical half portions oppositely facing and joining together along the contour of their inner edges, each half portion representing a front view of a predatory bird, said portion comprising besides the other features of the bird reflectory eyes set in sockets at an acute angle to the joint between the two sections forming the predatory bird, whereby at least two eyes are visible when viewed from all positions around the figure.

JOSEPH R. SWISHER.
JAMES A. SOULES.

REFERENCES CITED

The following references are of record in the file of this patent:

UNITED STATES PATENTS

| Number | Name | Date |
| --- | --- | --- |
| 118,853 | Grube | Sept. 12, 1871 |
| 928,744 | Fisher | July 20, 1909 |
| 931,367 | Aalborg | Aug. 17, 1909 |
| 1,457,388 | Newman | June 5, 1923 |
| 1,593,085 | Lang | July 20, 1926 |
| 1,968,809 | Curtis | Aug. 7, 1934 |
| 2,237,329 | Bischof | Apr. 8, 1941 |
| 2,294,241 | Rober | Aug. 25, 1942 |
| 2,396,441 | Seidler | Mar. 12, 1946 |

FOREIGN PATENTS

| Number | Country | Date |
| --- | --- | --- |
| 753,289 | France | Oct. 12, 1933 |